UNITED STATES PATENT OFFICE.

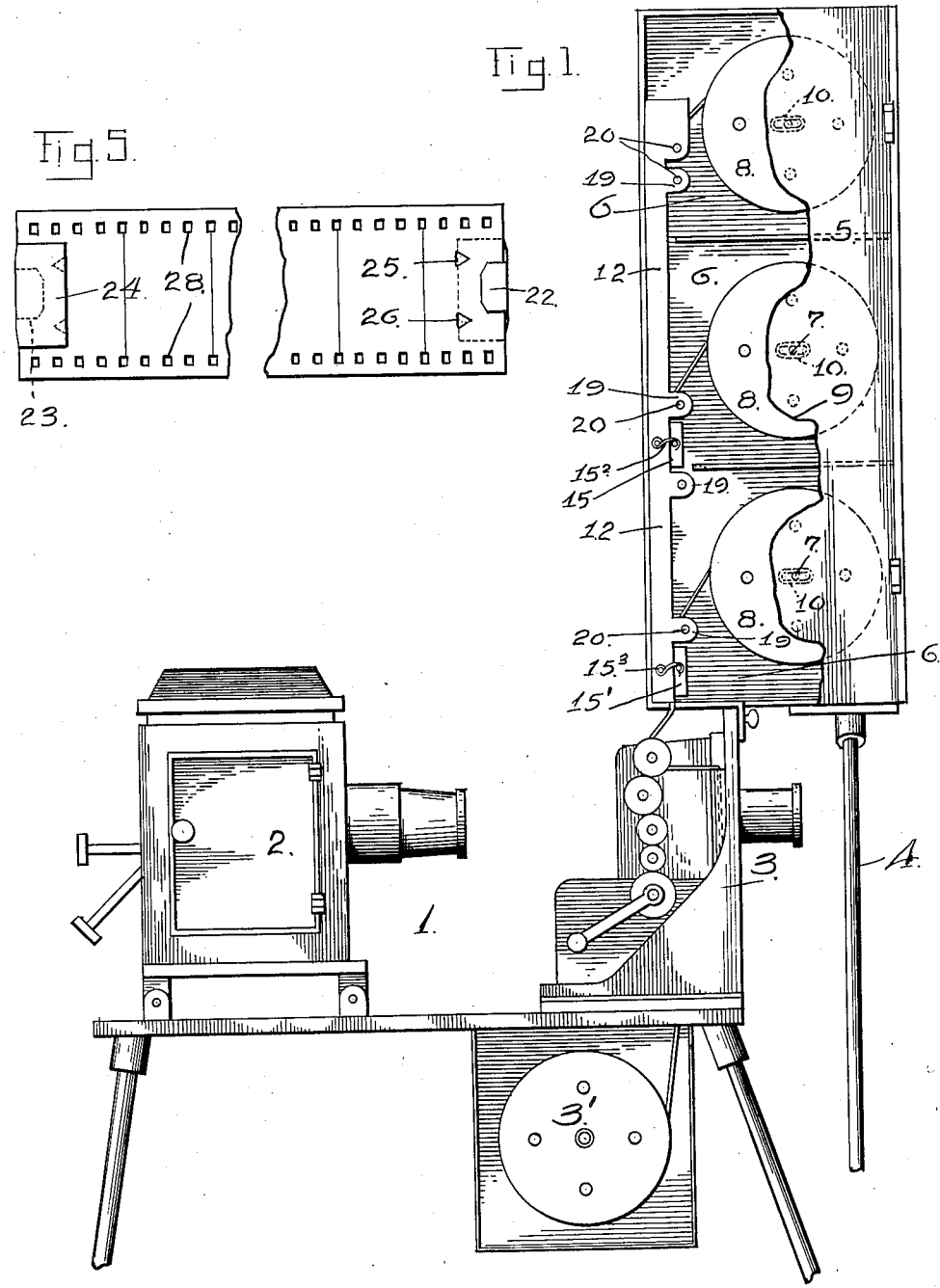

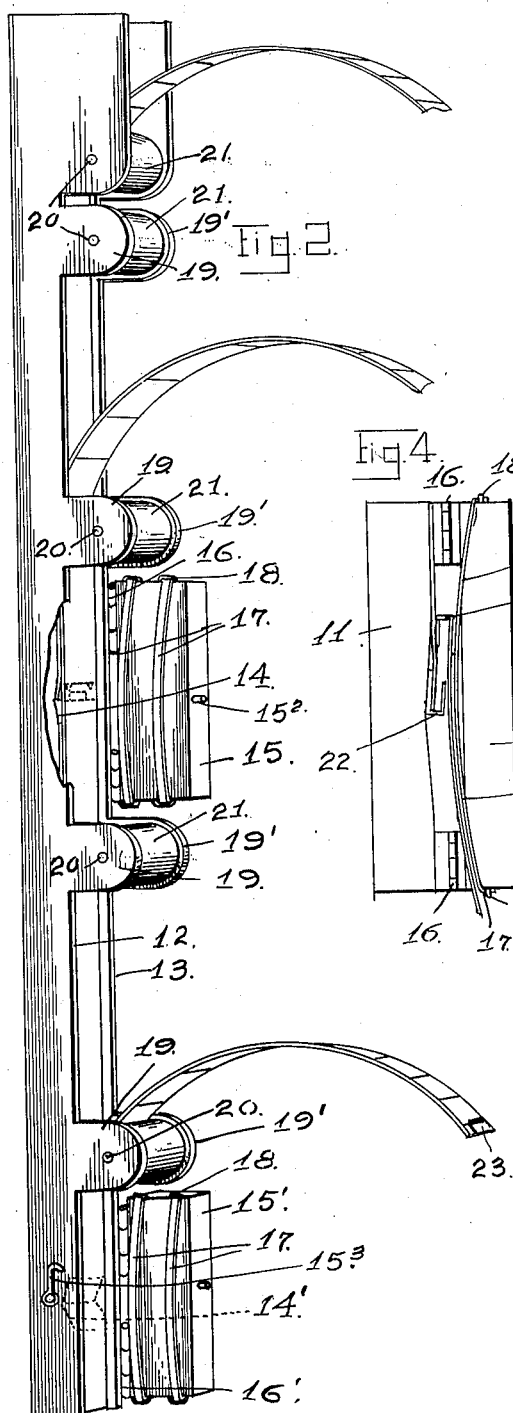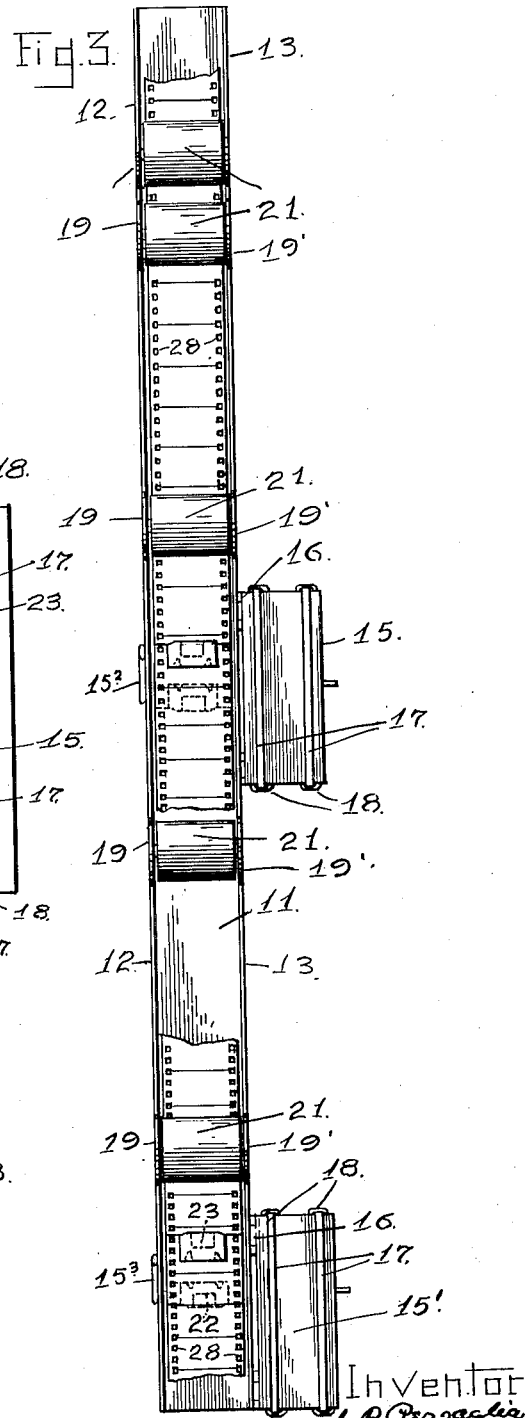

JOSEPH B. PEZZAGLIA, OF RIO VISTA, CALIFORNIA, ASSIGNOR OF ONE-HALF TO JOHN M. SULLIVAN, OF RIO VISTA, CALIFORNIA.

AUTOMATIC FILM-THREADER FOR MOTION-PICTURE MACHINES.

1,051,630. Specification of Letters Patent. Patented Jan. 28, 1913.

Application filed March 26, 1912. Serial No. 686,245.

*To all whom it may concern:*

Be it known that I, JOSEPH B. PEZZAGLIA, a citizen of the United States, residing at Rio Vista, in the county of Solano and State of California, have invented certain new and useful Improvements in Automatic Film-Threaders for Motion-Picture Machines, of which the following is a specification.

The hereinafter described invention relates to a new and useful automatic film pick-up and threading attachment for motion picture or other projecting machines, wherein the pictures to be displayed are carried by a series of reels, the films being fed one after the other to the projecting apparatus, and has for its principal object to provide a device through which the films to be projected are caused to pass before they are in the path of the projecting apparatus, whereby after the forward end of the film carried by the first reel is threaded into the projecting apparatus, the next succeeding reel of films will be automatically engaged by the rear end of the film preceding and automatically threaded into the projecting apparatus, thus avoiding the trouble and delay of threading by hand the end of each film into the projecting apparatus of the machine.

Another object is to provide a film threading device into which the forward end of each film is positioned, in the path of movement of the next preceding film and provided with an upstanding tongue which is engaged by a downwardly projecting tongue on the rear end of the next preceding film as the end of the film is unwound from its supporting reel, and thereby automatically picked-up and threaded through the projecting apparatus by the action of the preceding film.

The device consists of a cabinet adapted to be attached to or supported above the projecting apparatus in any suitable manner, the cabinet being divided into a series of separate compartments in each of which is rotatably mounted a reel of films, a track or guide-way communicating with each of said compartments and into which the forward end of each film is positioned with the end of the film in the path of movement of the next preceding film, spring pressed means carried by the track for interlocking the devices on the rear end of the film being projected with devices on the forward end of the next succeeding film, whereby the film being projected engages and threads the next succeeding film through the projecting apparatus.

It will be apparent that by the use of a device as herein described, the entire show of one or more reels of films may be set up in the track or guide-way and passed through the projecting apparatus one after the other, making the show a continuous display of pictures, and dispensing with the prevalent custom now in use of employing two machines in order to display a continuous show; one machine projecting one reel of films while the next reel to be projected is being threaded manually into the projecting apparatus of the other machine, or only employing one machine and causing the audience to wait a considerable length of time after one reel has been displayed until a new reel can be threaded into the projecting apparatus of the machine.

With the above mentioned and other objects in view, the invention consists in the construction and novel combination of parts hereinafter fully described, illustrated in the accompanying drawings forming a part of this invention, and pointed out in the claims hereto appended; it being understood that various changes in the form, proportion, size and minor details of construction within the scope of the claims hereto appended, may be resorted to without departing from the spirit or sacrificing any advantages of the invention.

To comprehend the invention reference should be had to the accompanying sheet of drawings, wherein—

Figure 1 is a side elevation of my improved device as mounted in a cabinet positioned above the projecting apparatus, disclosing the cabinet divided into compartments, each provided with a reel of films, the front ends of the films being seated in the guide-way, the adjustable supporting legs for the cabinet and the manner of positioning the cabinet relative to the projecting apparatus. Fig. 2 is a perspective view of my improved device removed from the cabinet, disclosing the track or guide partly broken away, the depressions in the upper surface thereof, the covers for said depressions being open, exposing the spring guides on the under surfaces thereof, and with a portion of three separate reels of films seated in said guide and held from lateral movement therein by suitable guide rolls. Fig. 3 is a top plan view of my improved device with a portion of three separate reels of films seated in said guide, disclosing the preceding strip of film overlapping the front end of the next film to be projected, and showing in dotted lines the catch on the film to be engaged by the catch on the film immediately preceding, seated in the depression in the guide. Fig. 4 is an enlarged detail of one of the depressions in the guide, with the side of the guide partly broken away, disclosing the cover for the depression in closed position, and a forward section of one film with the upstanding hooked portion at the front end thereof seated in said depression, and about to be engaged by the hooked portion at the rear end of the film immediately preceding. Fig. 5 is a detail of the hooked portions at the front and rear ends of the films.

Referring more particularly to the drawings, the reference numeral 1 designates any well known type of motion picture machine having the light box 2 and the lens and shutter mechanisms 3 through which the films pass onto a receiving reel 3' and the views thereon are projected onto a suitable screen not shown.

Supported in proximity to the mechanism 3 preferably above the same, as by the adjustable legs 4, is a suitable receptacle 5 divided into suitable compartments 6 in each of which is adapted to be rotatably mounted on a shaft 7, supported in any suitable manner, a reel 8 from which is unwound the film carrying the pictures which are to be projected successively on the screen. The reels 8 are positioned within and withdrawn from the receptacle 5, through an open side thereof which is adapted to be closed by a door 9, hinged to the receptacle in any suitable manner, and provided on its inner surface with suitable flat spring fingers 10 which, when the door is closed, are adapted to press against the side of the reel.

The film pick-up and threading apparatus disclosed in the drawings is constructed to operate with three reels of films, but it is to be understood that the device may be constructed to operate with two or more reels of films, and may be positioned either directly in communication with the lens and shutter mechanisms or at some distant point therefrom. Extending through each compartment 6 and through a suitable opening in one end of the receptacle 5, is a track or guide-way formed of a base board or member 11 and side flanges 12 and 13 projecting at right angles to the base member, the whole forming a guide, substantially rectangular in cross section, and of a width slightly greater than the film to be guided by the side flanges thereof. Suitable transversely extending notches or depressions 14 and 14' of substantially U-shaped character are provided at spaced intervals in the upper surface of the base member 11, and are adapted to be covered by suitable cover plates 15 and 15' hinged as at 16 and 16' to one of the flanges, the plates 15 and 15' being provided on their under side adjacent the longitudinal edges thereof with a pair of longitudinally extending flexible spring fingers 17, the ends of which are secured to the ends of the cover plate 15, as at 18; the cover plates being held in closed position by suitable catches 15² and 15³. Projecting from the edges of the side flanges 12 and 13 and arranged oppositely from each other are arms 19 and 19', in which are journaled the ends of shafts 20 which support idler rollers 21 which confine the films within the guide after they are once fed thereto. At the front and rear ends of each film is provided a suitable hook member or catch 22 and 23, the hooks thereof being positioned to open respectively at the opposite face of the film, as disclosed in Fig. 5 of the drawings, so that as the rear end of the film carrying the downwardly projecting hook passes the front end of the film next to be projected, the upwardly projecting hook 22 at the front end of said mentioned film will be engaged by the hook 23 at the rear of the preceding film and the two films connected together. Any suitable hooks may be used but the ones disclosed in the drawing comprise a flat plate 24 provided at one edge with a pair of pointed tongues 25 and 26 which are forced through the film body near the end thereof and then bent over clamping the film between the under surface thereof and the plate, and the opposite edge is provided with a substantially flat hook which extends around the end of the film, the tongue thereof pointing in an opposite direction to the tongues 25 and 26. The plates 24 are positioned on the film between the perforations 28 at each edge thereof, and the meeting ends of the films are so arranged that the end perforations when the films are attached together will be the same distance apart as they are in the film body.

The device is used in the following manner:—The reels carrying the films to be projected are mounted on the shafts 7, the cover plates 15 and 15' are thrown back exposing the depressions or notches 14 and 14', the front end of the last reel of films to be projected is inserted under the idler rollers 21 and pulled forwardly until the hooked portion 22 at the extreme front thereof rests in the notch or depression 14 with the hooked portion 22 upwardly facing; the forward end of the roll of films immediately preceding is inserted under the idler 21, as in Fig. 2 of the drawings; fed forwardly over the hooked portion 22 that rests in the notch or depression 14 until the hooked portion 22 at the extreme forward end thereof rests in the notch or depression 14', the cover 15 is now moved into position and held down by a catch, as in Fig. 4 of the drawings. The outer end of the film carried by the first reel is now inserted under an idler and fed forwardly, as in Fig. 2 of the drawings, the end thereof being carried through the feeding device in the shutter and lens mechanism 3, and fastened to a receiving reel 3'. The cover plate 15' is now swung into position and held down by a catch, as in Fig. 4, and as the pictures on the films are projected successively onto the screen by the operation of the mechanism 3 and the exposed end of the film wound around the receiving reel 3', the rear end of the first reel of films will be unwound from its supporting reel and as the hook 23 carried thereby passes under the cover plate 15', it will be forced into engagement by the spring fingers 17 with the upwardly projecting hooks 22 lying in the depression 14', and thus threading the forward end of the next succeeding film through the mechanism 3, and as the end of the film approaches the receiving reel 3', the hooked ends 22 and 23 of the two films are detached from each other, the filled receiving reel removed, a new one positioned in its place and the second reel of films wound thereon.

The above operation and steps taking place for each reel of films to be displayed and it will be observed that it is only required to thread the first reel of films to the machine and the rest are automatically picked up and threaded through the machine by the film immediately preceding. The time occupied in uncoupling one film from another and changing the receiving reels is very little, and as the reels of films are threaded successively through the machine a nearly continuous display of pictures is made.

Having thus described the invention what I claim as new and desire to secure by Letters Patent is—

1. In combination with a series of films for moving picture display, of an engaging device carreid at the rear end of the foremost film for engagement with a corresponding device on the front end of a successive film, and means within the path of the films for automatically forcing said devices into locked engagement during the movement of the foremost film whereby the successive film is threaded by the movement of the foremost film.

2. In combination with a series of films for moving picture display, of an engaging device carried at the rear end of the foremost film for engagement with a corresponding device on the front end of a successive film, and means within the path of the film for automatically forcing said devices into locked engagement during the movement of the films whereby the successive film is threaded by the movement of the foremost film.

3. In combination with a series of films for moving picture display, of an engaging device carried at the rear of a preceding film for engagement with a corresponding device on the forward end of a successive film, a guide through which said films are caused to pass, and means associated with the guide within the path of the films for automatically forcing said engaging devices into locked engagement during the movement of the films, whereby the successive film is threaded by the movement of the foremost film.

4. The combination with a series of films for moving picture display, of an engaging device carried at the rear end of the foremost film for engagement with a corresponding device on the forward end of a successive film, a guide through which said films are caused to pass, the front film passing over the forward end of the successive film, a depression in said guide for the reception of the engaging device carried by the successive film, and spring pressed means associated with said depression for forcing said engaging device carried by the rear end of the foremost film into locked engagement with the corresponding device seated in said depression during the movement of the films whereby the successive film is threaded by the movement of the foremost film.

5. The combination with a series of films for moving picture display, of an engaging device carried at the rear end of the foremost film for engagement with a corresponding device on the forward end of a successive film, a guide through which said films are caused to pass, the front film passing over the forward end of the successive film, a depression in said guide for the reception of the engaging device carried by the successive film, guide rolls for retaining said films within said guide, a cover plate hinged to one side of said guide adjacent said depression, and provided on its under surface with a pair of spring fingers adapted when the cover is in closed position to force said engaging device carried by the rear end of the foremost film into locked engagement with the corresponding device seated in said depression during the movement of the films, whereby the successive film is threaded by the movement of the foremost film.

6. In combination with a series of films for moving picture display, of an engaging device carried at the rear end of the foremost film for engagement with a corresponding device on the forward end of a successive film, a guide through which said films are caused to pass, the foremost film passing over the forward end of the successive film, and means associated with the guide within the path of the films for automatically forcing said engaging devices into locked engagement during the movement of the films, whereby the successive film is threaded by the movement of the foremost film.

7. A threader for a plurality of motion picture films, comprising a guide through which said films are caused to pass, and means associated with said guide for pressing the films into interengaging relation.

8. A threader for a plurality of motion picture films, comprising a guide through which said films are caused to pass, a depression in said guide within the path of the films, interengaging means carried by the ends of the respective films and means associated with said depression for automatically causing the rear end of a foremost film to move into locked engagement with the forward end of a successive film.

9. A threader for a plurality of motion picture films, comprising a guide through which said films are caused to pass, a depression in said guide within the path of said films, interengaging means carried by the ends of the respective films, and a cover plate associated with said depression for automatically causing the rear end of a foremost film to move into locked engagement with the forward end of a successive film.

10. A threader for a plurality of motion picture films, comprising a guide through which said films are caused to pass, a depression in said guide within the path of said films, a cover plate associated with said depresssion interengaging means carried by the ends of the respective films, and spring pressed means carried by said cover plate for automatically causing the rear end of a foremost film to move into locked engagement with the forward end of a successive film.

11. A threader for a plurality of motion picture films, comprising a guide through which said films are caused to pass, interengaging means associated with the respective films and means associated with said guide for automatically locking a foremost film into engagement with a successive film.

12. A threader for a plurality of motion picture films, the same comprising a guide for said films, an engaging device carried by the rear end of a foremost film for engagement with a corresponding device on the forward end of a successive film, whereby the successive film is threaded by the movement of the foremost film.

13. A threader for a plurality of motion picture films, the same comprising a guide for said films an engaging device carried by a foremost film for engagement with a corresponding device on a successive film, whereby the successive film is threaded by the foremost film.

In testimony whereof I have signed my name to this specification in the presence of two subscribing witnesses.

JOSEPH B. PEZZAGLIA.

Witnesses:
EMERY E. CHURCH,
H. J. DIRR.